United States Patent [19]

Wolf et al.

[11] 4,191,390

[45] Mar. 4, 1980

[54] GASKET RING WITH LOCKING RINGS

[75] Inventors: Franz-Josef Wolf, Bad Soden-Salmunster; Dieter Roth, Schluchtern-Kressenbach, both of Fed. Rep. of Germany

[73] Assignee: WOCO Franz-Josef Wolf & Co., Bad Soden-Salmunster, Fed. Rep. of Germany

[21] Appl. No.: 943,230

[22] Filed: Sep. 18, 1978

[30] Foreign Application Priority Data

Sep. 27, 1977 [DE] Fed. Rep. of Germany ....... 2743238
Dec. 9, 1977 [DE] Fed. Rep. of Germany ....... 2754982

[51] Int. Cl.² ............................................. F16J 15/10
[52] U.S. Cl. ..................................... 277/219; 277/101; 277/DIG. 2
[58] Field of Search .................. 277/219, 207, DIG. 2, 277/223, 220, 101

[56] References Cited

U.S. PATENT DOCUMENTS

| 3,603,618 | 9/1971 | Stratton | 277/101 |
| 3,787,059 | 1/1974 | McCormick | 277/219 |
| 3,787,061 | 1/1974 | Yoakum | 277/207 A |

FOREIGN PATENT DOCUMENTS 1971296 6/1967 Fed. Rep. of Germany .
1250214 9/1967 Fed. Rep. of Germany .
1133412 11/1968 United Kingdom .............. 277/DIG. 2

*Primary Examiner*—Robert I. Smith
*Attorney, Agent, or Firm*—Fishman and Van Kirk

[57] ABSTRACT

A sealing ring assembly particularly well suited for use in concrete pipes through which a liquid is flowed includes a gasket ring and a locking ring which cooperates therewith. The gasket ring is comprised of a resilient material and defines a recess which receives a plastic locking ring which is preferably formed by injection molding.

8 Claims, 5 Drawing Figures

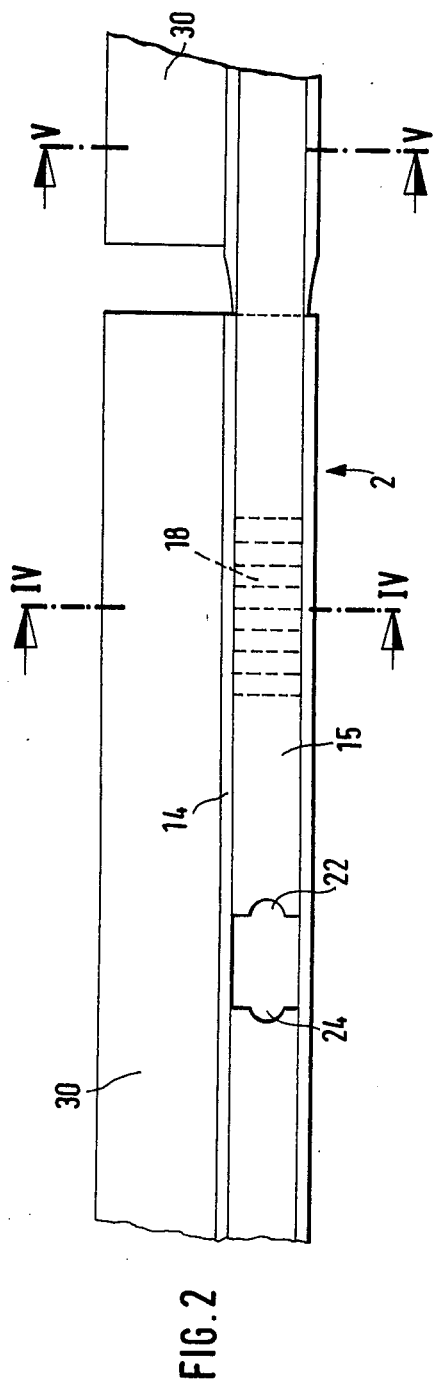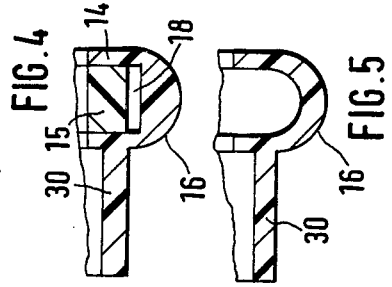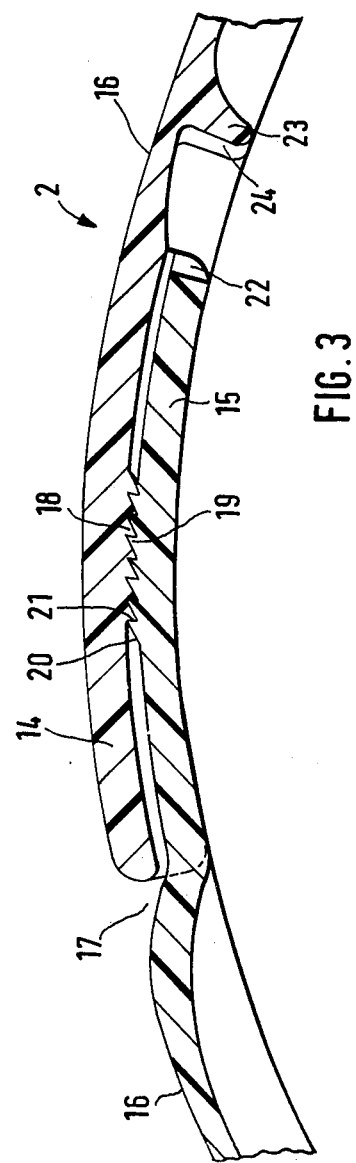

GASKET RING WITH LOCKING RINGS

BACKGROUND OF THE INVENTION (1) Field of the Invention

The present invention relates to the establishment of fluid tight seals and particularly the sealing of pipe joints. More specifically, this invention is directed to a sealing ring assembly comprising a gasket ring and a cooperating locking ring. Accordingly, the general objects of the present invention are to provide novel and improved methods and apparatus of such character.

(2) Description of the Prior Art

While not limited thereto in its utility, the present invention is particularly well suited for use in the establishment of a fluid tight seal, particularly a liquid seal, for pipe plug joints between an outer conduit element, hereinafter referred to as a "socket", and an inner conduit element which is inserted into the "socket" and which will hereinafter be referred to as the "pointed tip" or "tip". Sealing or gasket rings intended for prefitting in sockets, for example sockets at the joint between serially connectd concrete pipes, are customarily of one or two types. The sealing rings of the first type are known as "roll rings" which are not firmly fastened to the socket. The sealing rings of the second type are known generally as lip gasket rings and are clamped against axial displacement upon insertion of the pointed tip into the socket. A "lip gasket ring" is a sealing element wherein the pipe joint is sealed by means of at least one sealing lip which contacts the conduit tip which is inserted into the socket. The present invention relates to gasket rings of the "lip" type which are fixed in the socket against axial movement.

Gasket or sealing systems of the type with which the present invention is concerned are predominently used to seal the joints between conduit sections wherein the conduits are comprised of mineral materials such as calcined clay, concrete or asbestos cement. When used in the environment of a conduit comprised of a mineral material, the sealing lips of the gasket ring must retain a high degree of mobility while the gasket ring as a whole should not be axially movable. Additionally, because of the manufacturing tolerances inherent in the manufacture of pipes of mineral materials, the gasket systems, and particularly the sealing ring itself, must have the capability of establishing a seal over a relatively wide range of spaces between the tip and socket of the adjacent pipes.

Prior gasket ring systems suitable for use with pipes comprised of mineral materials comprise three functional elements: (1) a gasket ring or ring-shaped sealing lip, (2) a ring-shaped anchoring device, and (3) a ring-shaped intermediate flange which connects the gasket ring and anchoring device. For anchoring a gasket ring to the socket at the end of a conduit section, three techniques have been widely used in the prior art. These techniques include casting, cementing and clamping or locking. The casting and cementing techniques have obvious disadvantages; and the present invention relates to a gasket ring system including a clamping or locking member which provides the axial fixation of the gasket or sealing ring in the socket. More particularly, the present invention pertains to that type of joint seal assembly wherein a gasket ring is fixed by a locking ring in an annular groove formed in the wall of the socket. In accordance with the prior art, the locking rings employed in this type of sealing ring assembly consist of open, spring washers which are pre-stressed radially outwardly and have a circular or flat rectangular cross-section.

Further considering the prior art, it is known to employ spring-lock washers with flat rectangualr surface for immobilizing a gasket ring. Such spring type lockwashers are not suitable for holding rubbery elastic gasket rings in pipes comprised of mineral materials with sufficient firmness. Thus, in practice the gasket ring is not held with sufficient force at the upper limits of the tolerance range while warping of the locking ring and/or of the gasket ring will occur at the lower limits of the tolerance range. Bearing in mind that in many applications, for example in sewer technology, the gasket assembly must be capable of maintaining a leak tight seal for as much as twenty years, it may be understood why locking rings of the open, spring washer type have not been accepted.

The task of achieving a problem-free axial fixation of a gasket ring in pipe plug joints with large diameter tolerance ranges is particularly prevalent in cases where the gasket rings are of the type which have four sealing lips arranged, when the sealing ring is viewed in cross section, in either essentially cross-shaped or X-shaped pattern. Gasket rings having four sealing lips have been developed to correspond to waste water regulations which require integrity of the joint against both internal pressure and external pressure. Considering the harsh conditions to which the gasket ring assembly may be subjected, it is essential that the gasket rings be capable of unhindered pivoting or twisting through their principal radial plane. Thus, the gasket rings require a high degree of mobility and must nevertheless be fixed in position whereby the gasket ring assembly is characterized by axial stability. The prior art has not previously solved the problem of providing adequate mobility or flexibility combined with axial stability.

SUMMARY OF THE INVENTION

The present invention overcomes the above-discussed and other deficiencies and disadvantages of the prior art by providing a sealing ring assembly, and a gasket ring and locking ring for use therein, of novel and useful design. A sealing ring assembly in accordance with the present invention can be employed in situations where the pipe joint to be sealed is characterized by high manufacturing diameter tolerances and the present invention can be installed easily and absolutely irremoveably. The locking ring of the present invention is particularly suitable for use in the securing of four-lipped sealing rings which are cross-shaped or X-shaped in cross section.

A gasket ring assembly in accordance with the present invention includes a locking ring of the split-ring type which overlaps itself on the free ends and which can be radially expanded but which locks on itself to prevent any reduction in radius. A locking ring in accordance with the present invention will initially be in an unexpanded; i.e., minimum diameter; condition and when expanded will reliably and firmly force a retainer portion of a gasket ring into a complementary shaped recess in the inner wall of a pipe joint socket; the diameter of the socket or the recess therein being larger than the nominal or unexpanded diameter of the retaining ring.

Because the locking ring of the present invention automatically locks on itself to prevent a reduction in the diameter thereof, the gasket ring which cooperates therewith is fixed in the socket against axial displacement and also against unanticipated or undesired removal as a consequence of external influences which are not associated with the insertion of the tip of a cooperating conduit section into the socket. This feature is of particular importance since it permits the flexibility of installation of the sealing ring in the socket prior to delivery of the conduit to the field and also allows the conduit to be stored at the construction site, where it is generally accessible to vandalism, with minimal danger that the gasket ring assembly will be removed.

In accordance with a preferred embodiment, a locking ring for a gasket ring assembly in accordance with the present invention is characterized by a U-shaped profile in axial cross-section with the open end of the U-shape facing radially inwardly. A first end of the ring, which is of split-ring construction, defines a clasp or locking member which is of suitable dimension so as to be received in the U-profile of the opposite end of the ring. The automatic locking is achieved through the provision of intermeshing complementary saw-tooth profiles which are formed on the facing interior base of the U-profile and the end of the clasp portion which is received therein. The interacting ratchet surfaces of these two serrated profiles are preferably undercut in such a way that, with the ring in the locked condition, a disengagement of the clasp portion from the cooperating U-profile portion with serrated base is prevented by the opposed tension forces acting tangentially to one another.

Also in accordance with a preferred embodiment of the invention, means are provided to permit expansion of the locking ring with a simple hand tool. The means which facilitates expansion of the locking ring may, for example, comprise holes, flanges or depressions which may be engaged by the jaws of the spreading tool.

A further characteristic of a locking ring in accordance with the present invention is that it presents a substantially smooth circular outer surface contour, interrupted only by a relatively small gap, rather than a spiral surface. The elimination of spiral overlapping surfaces guarantees a firm and uniform impression of the retaining portion of the gasket ring, with which the locking ring cooperates, into a complementary shaped recess in a pipe socket.

In the case of pipes of large diameter, it is often desirable to impart additional stability to the locking ring to prevent any axial rolling or deformation thereof. In accordance with one embodiment of the present invention this is accomplished by providing a flat web which extends laterally outwardly from either one or both arms which define the U-profile of the locking ring. The web or webs, if provided, are essentially axial and perpendicular to the sides of the locking ring and thus form cylindrical ring hoops which lie concentric to the socket wall when the gasket ring assembly is installed. The web or webs are at least wide enough to prevent rolling of the locking ring in the axial direction and, in accordance with a preferred embodiment, the web is twice as wide as the U-profile of the locking ring and the locking ring will have a generally square cross-sectional shape.

Also in accordance with the present invention, a gasket ring having four sealing lips is employed. The gasket ring is designed such that, when fixed in the socket by the locking ring, it is capable of being tipped or rolled through radial primary plane running approximately through the point of intersection of the axes of the four sealing lips whereby two radial inner sealing lips and two radial outer sealing lips are essentially symmetrically disposed with respect to the radial primary plane. In accordance with a preferred embodiment of the invention, the gasket ring is provided with a retainer portion in the form of a web which extends toward the pipe joint from a point intermediate the length of the outer external pressure sealing lip. The gasket ring is secured to the wall of the socket by means of this retaining member and the manner of attachment of the retaining member to the remainder of the gasket ring, as described above, insures that the outer external pressure lip reliably faces in the direction of insertion of the conduit tip.

In accordance with alternative embodiments of the invention, the self-locking of the ends of the locking ring, against undesired reduction in the radius of the locking ring, may be achieved through the use of a clamping key mechanism, a ratchet mechanism or a locking peg mechanism.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which:

FIG. 2 is a partial top plan view of a locking ring in accordance with a preferred embodiment of the invention which may be employed with the sealing ring of FIG. 1;

FIG. 3 is a partial, cross-sectional side elevation view of the locking ring of FIG. 2;

FIG. 4 is a cross-sectional view, taken along line IV—IV, of the locking ring of FIG. 2; and FIG. 5 is a cross-sectional view, taken along line V—V of the locking ring of FIG. 2.

DESCRIPTION OF THE PREFERRED EMBODIMENT

Figure 1:
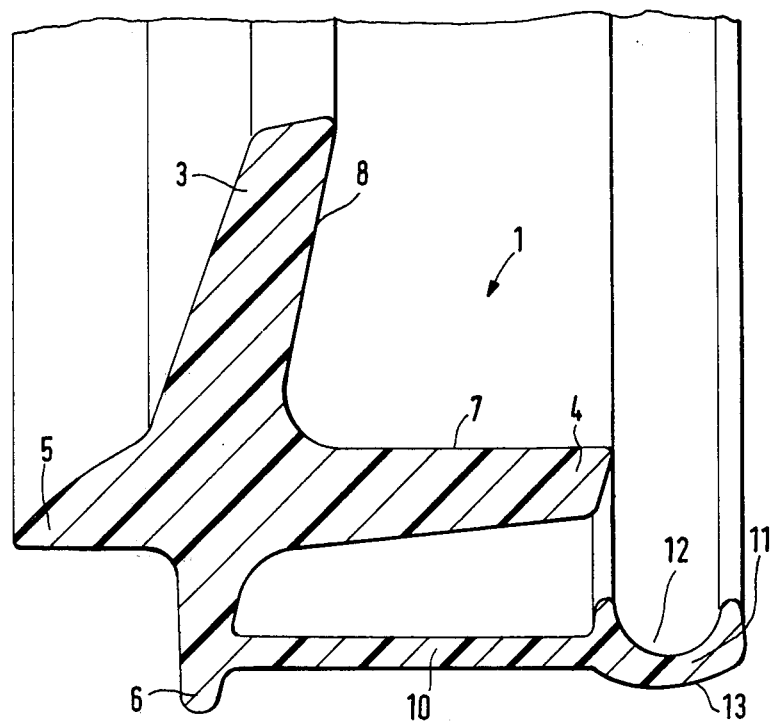
FIG. 1 is a schematic representation, taken in axial section, of a sealing ring in accordance with a preferred embodiment of the present invention.

A gasket or sealing ring in accordance with the present invention is indicated generally at 1 in FIG. 1. A lock ring in accordance with the invention, which may be employed to retain the gasket ring 1 in position in a socket provided therefor adjacent the end of a conduit section, is depicted in FIGS. 2–5 indicated generally at 2. The gasket ring 1 will be comprised of a suitable resilient material and is provided with four ring-shaped sealing lips 3, 4, 5 and 6. In the disclosed embodiment, the four sealing lips of the gasket ring are oriented relative to one another such that the gasket ring, in axial cross section, has essentially an X-shaped profile. As shown in FIG. 1, the gasket ring 1 is in its "standing" position; i.e., in an undeformed state which the sealing ring would assume prior to the "pointed tip" of a conduit section being inserted therein. Thus, it is to be understood that the socket in the conduit section which receives the gasket ring and a second conduit section between which a seal is to be effected have been omitted from the drawing in the interest of facilitating understanding of the invention. In FIG. 1, however, the base of the gasket ring receiving socket would be at the left of the ring, the opening of the socket would be at the right of the ring, the cylindrical inner wall of the socket would be located below the ring and the conduit tip would be inserted into the socket from the right to the left. Thus, the inner internal lip 3 will establish a seal on the outside of the conduit tip against internal pressure, the external lip 6 will establish a seal against external pressure at the inner wall of the socket, the lip 4 will seal against external pressure at the outer wall of the tip and the outer internal lip 5 will seal against internal pressure at the inner wall of the socket.

The above-described sealing relationships result from the fact that, when a pointed conduit tip is inserted into the socket in which the gasket ring 1 is positioned, the tip wil move across the surface 7 of lip 4 and contact the surface 8 of lip 3. Further insertion of the conduit tip into the socket will cause the gasket ring 1 to be tipped or rolled counterclockwise through its radial primary plane. This rolling motion continues until the sealing lips 3 and 4 both contact the wall of the inserted conduit tip while the sealing lips 5 and 6 are both urged into contact with a wall of the socket.

The above briefly described tipping or pivoting rolling motion must be achieved without the gasket ring 1 being pushed axially towards the base of the socket; i.e., to the left as the gasket ring is shown in FIG. 1. The fixing of the position of the gasket ring is accomplished, in part, by the provision thereon of a web member which extends forwardly from sealing lip 6; i.e., as shown in FIG. 1 the webs 10 extends generally in the same direction as the sealing lip 4 and is essentially coaxial therewith. The junction of web 10 and sealing lip 6 occurs at the outer half of lip 6 and preferably at a point which is one-third the distance between the outer end and route of the lip. Because of its location, the sealing function of lip 6 will not be affected by the presence of web 10 since, after the pivoting or rolling of the gasket ring and its deformation between the inserted conduit tip and the wall of the socket, the web 10 will be substantially tension free. The web 10, at its free end, is formed into a retainer portion 11 having a radially outwardly facing annular groove 12. The profile of groove 12 is complementary to the profile of the locking ring 2 which will be inserted therein to complete installation of the gasket ring in the socket. The exterior configuration 13 of gasket ring 1 will correspond to the profile of an annualar groove formed in the wall of the socket. As will be described below in the discussion of FIGS. 2–5, cooperation of the retainer portion 11 of gasket ring 1 with the retaining or locking ring 2 will result in the gasket ring being immobilized in the socket without adversely affecting the ability of the gasket ring to tip or roll as described above.

Continuing with a discussion of FIG. 1, web 10 is preferably of sufficient length that the retainer portion 11 of the gasket ring extends forwardly of the outwardly facing forward edge of sealing lip 4. This arrangement facilitates the insertion and tightening of the locking ring. However, if necessary or desirable, the web 10 may be of such length that the retaining portion 11 thereof does not extend outwardly beyond the outwardly facing forward edge of lip 4.

Referring now to FIGS. 2–5, the locking ring 2 is particularly well suited for use with the gasket ring 1 of FIG. 1. It is to be understood, however, that locking ring 2 may be used with other types of sealing rings. The locking ring of FIGS. 2–5 is formed from a single piece of plastic by means of injection molding.

Before discussing the structure of the preferred locking ring embodiment as shown in FIGS. 2–5, the manner of use thereof will be briefly described. The resilient gasket ring may be inserted by hand into a socket at the end of a first length of conduit, with the retaining portion 11 therein in registration with an annular groove in a socket wall, and the locking ring 2 thereafter inserted into the groove 12 in the retaining portion of the gasket ring. Assembly is completed by expanding the locking ring through the use of suitable tool whereby the retaining portion 11, and particularly the surfaces 13 thereof, will be fixed in the socket and the gasket ring 1 will be secured against axial displacement and undesired or unforeseen removal through the web 10. Alternatively, the groove 12 in the retaining portion 11 of the gasket ring can be provided with a clamping bead at its inner edge. This clamping bead, if provided, will engage a locking ring which will be premounted in the said groove 12. Accordingly, the gasket ring and locking ring can be supplied as a single unit which would be inserted and tightened in a single step.

Locking ring 2 is formed as an open or split ring having a U-shaped profile and overlapping ends. The U-shaped profile is extended to one end 14 of the locking ring while the opposite end 15 defines a latch element which can be engaged in the U-profile when the two ends of the ring are overlapped as shown in FIGS. 2 and 3. The latch element 15 has a reduced width when compared to the remainder of the locking ring whereby, upon closure of the ring, a spiral shape is not presented, Rather, the outer surface 16 of the locking ring is, with the exception of small gap 17, which may best be seen from FIG. 3, defines an uninterrupted circular path.

End 14 of ring 2 is provided, on the inwardly facing base surface thereof, with a saw-tooth contour 18. The outwardly facing surface of latch element 15 is provided with a saw-tooth contour 19 which is complementary to contour 18. The saw-tooth or serrated ring portions cooperate to prevent a reduction in the diameter of the locking ring but to permit radial expansion of the ring. The sliding surfaces 20 of the saw-tooth configurations are inclined at an angle of approximately 60° with respect to the perpendicular to the tangent through the upper edge of each serration. The locking surfaces 21 of the saw-tooth configurations are undercut so as to be inclined in the same direction as the sliding saw-tooth surfaces 20 at an angle of approximately 10° with respect to a perpendicular to the tangent through the upper surface of each serration. This undercutting can be as much as 30° and should be at least 50°–8°. The undercutting of the locking surfaces prevents the element 15 from being lifted or broken out of the end 14 should the locking ring 2 be tangentiallly stressed and radially expanded. The undercutting thus aids in affording additional theft security for a preassembled gasket ring.

Referring to FIG. 2, the front edge of latch element 15 is provided with a semi-cylindrical depression 22. Referring to FIG. 3, an axially extending rib 23 is provided in the trough defined by U-shaped portion 14 of ring 2. Rib 23, as may be seen from joint consideration of FIGS. 2 and 3, is also provided with a semi-cylindrical depression 24. The depressions 22 and 24 are posed; i.e., are in facing relationship; and are intended to receive an installation tool which may, for example, be the gripping lugs of a conventional pair of pliers or spreading pliers. The provision of the opposed depressions 22 and 24 facilitates the installation and tightening of the locking ring 2 in the groove 12 of the gasket ring 1.

A further important feature of the present invention may be seen from a joint consideration of FIGS. 2, 4 and 5. The locking ring 2, at its axial internal side, is provided with a vane 30 which projects outwardly in a direction which is essentially perpendicular to the axis of the U-shaped profile. Vane 30 is formed integrally with the remainder of the locking ring and serves to prevent axial rolling of the locking ring. While band 30 is shown as extending from only a first side of the locking ring, obviously a second band can be provided on the opposite side thereof.

As shown in FIGS. 4 and 5, the vane 30 is located at a point which corresponds to approximately the midpoint of the height of the locking ring. Accordingly, vane 30 is not exposed to radial forces upon tightening of the locking ring. When the locking ring of FIGS. 2–5 is employed with the gasket ring of FIG. 1, the vane 30 will be supported on the inner surface of web 10 upon completion of installation of the locking ring.

Both upon delivery of the gasket ring and the locking ring in the form of two separate components, and also in the case of the preassembled but un-tensioned gasket ring assembly which includes a locking ring, the locking ring is under low pretension to reduce its radius. Thus, the overlapping ends 14 and 15 of locking ring 2 are positioned relative to one another such that the locking ring will have the smallest possible diameter.

As noted above, the locking ring of FIGS. 2–5 may be used with various types of sealing rings. Thus, by way of example, the locking ring 2 may be used with gasket rings having one, two, three or four sealing lips. In this case, the locking ring 2 may also be employed with sealing rings which do not seal according to the principle of ring lip seals but rather which achieve sealing by material pressure. It is also to be noted that, for some applications, the web 10 on the gasket ring of FIG. 1 may be eliminated and the groove or slot for receiving the locking ring formed on the body of the gasket ring itself. However, the preferred embodiment of the invention utilizes the gasket ring locking ring configuration shown in the above-discussed drawing wherein dislodging of the locking ring from the groove in which it is received in the gasket ring is effectively prevented by the vane 30 which is formed as a flat strip. The groove 12 in the retaining portion 11 of the gasket ring 1 may, however, be flattened or entirely omitted and replaced by a claming bead or clamping pocket on the radially internal ring surface of the web 10 which receives and holds the axially internal edge of the flat band vane 30.

While preferred embodiment has been shown and described, various modifications and substitutions may be made thereto without departing from the spirit and scope of the invention. Accordingly, it is to be understood that the present invention has been described by way of illustration and not limitation.

What is claimed is:

1. A sealing ring assembly including:
a sealing ring of elastic material adapted for insertion in a pipe element, said sealing ring having a contoured annular retaining ring with a concave opening facing radially inwardly with respect to said sealing ring, said retaining ring being adapted to engage an annular groove in a pipe to secure said sealing ring against axial displacement; and
a clamping ring for engagement with said retaining ring, said clamping ring being a split ring the major portion of which is U-shaped in cross section, said clamping ring having overlapping ends, one of said overlapping ends being reduced in size to fit within and engage the other of said overlapping ends to form a substantially uninterrupted circular path, said clamping ring being radially expandable, and said clamping ring including locking means to prevent radial contraction of said clamping ring.

2. A sealing ring assembly as in claim 1 wherein:
said locking means includes locking teeth on the inner side of said one end and locking teeth on the outer side of said other end, said teeth being of sawtooth configuration and having mating sliding surfaces and locking surfaces undercut from 5° to 30° with respect to the sliding surfaces.

3. A sealing ring assembly as in claim 2 wherein:
said one end has a first depression at the extreme end thereof and said other end has an inwardly depending radial rib with a second depression therein facing the first depression, said depressions cooperating to form structure to receive an installation tool.

4. A sealing ring assembly as in claim 1 including:
axial vane means extending from at least one side of the exterior of said U-shaped clamping ring.

5. A sealing ring assembly as in claim 1 including:
an axial vane extending from the exterior of said U-shaped clamping ring in the direction to extend into a pipe element in which the clamping ring is to be mounted.

6. A sealing ring assembly as in claim 1 wherein:
said contoured annular retaining ring is joined to said sealing ring by an annular web.

7. A sealing ring assembly as in claim 1 wherein:
said sealing ring is X-shaped or cross-shaped in axial cross-section with a plurality of sealing lips.

8. A sealing ring assembly as in claim 7 wherein :
said retaining ring is connected to one of said lips by an annular web.

* * * * *